(12) United States Patent
Sun et al.

(10) Patent No.: US 12,456,481 B2
(45) Date of Patent: Oct. 28, 2025

(54) METHOD AND APPARTUS FOR AUDIO PROCESSING USING A NESTED CONVOLUTIONAL NEURAL NETWORK ARCHITECHTURE

(71) Applicant: DOLBY LABORATORIES LICENSING CORPORATION, San Francisco, CA (US)

(72) Inventors: Jundai Sun, Beijing (CN); Lie Lu, Dublin, CA (US); Zhiwei Shuang, Beijing (CN)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 278 days.

(21) Appl. No.: 18/032,325

(22) PCT Filed: Oct. 19, 2021

(86) PCT No.: PCT/US2021/055691
§ 371 (c)(1),
(2) Date: Apr. 17, 2023

(87) PCT Pub. No.: WO2022/087025
PCT Pub. Date: Apr. 28, 2022

(65) Prior Publication Data
US 2023/0386500 A1    Nov. 30, 2023

Related U.S. Application Data

(60) Provisional application No. 63/164,028, filed on Mar. 22, 2021, provisional application No. 63/112,220, filed on Nov. 11, 2020.

(30) Foreign Application Priority Data

Oct. 19, 2020  (WO) ................ PCT/CN2020/121829
Dec. 3, 2020   (EP) ..................................... 20211501
Mar. 2, 2021   (WO) ................ PCT/CN2021/078705

(51) Int. Cl.
*G10L 25/30*   (2013.01)
*G06N 3/0464*  (2023.01)
*G10L 25/84*   (2013.01)

(52) U.S. Cl.
CPC ............ *G10L 25/30* (2013.01); *G06N 3/0464* (2023.01); *G10L 25/84* (2013.01)

(58) Field of Classification Search
CPC ......... G10L 25/30; G10L 25/84; G10L 25/18; G06N 3/045; G06N 3/0464; G06N 3/04; G06T 7/11; G06T 2207/20016
See application file for complete search history.

(56) References Cited

U.S. PATENT DOCUMENTS

| 8,345,984 B2 | 1/2013 | Ji |
| 9,251,783 B2 | 2/2016 | Kalinli-Akbacak |

(Continued)

FOREIGN PATENT DOCUMENTS

| JP | 2018181124 A | * 11/2018 |
| WO | 2020128134 A1 | 6/2020 |
| WO | 2020232180 A1 | 11/2020 |

OTHER PUBLICATIONS

Chen et al,. "DeepLab: Semantic Image Segmentation with Deep Convolutional Nets, Atrous Convolution, and Fully Connected CRFs", Apr. 27, 2017, IEEE, vol. 40, Issue 4 https://ieeexplore.IEEE.org/document/7913730 (Year: 2017).*

(Continued)

*Primary Examiner* — Yogeshkumar Patel

(57) ABSTRACT

Systems, methods, and computer program products for audio processing based on convolutional neural network (CNN) are described. The CNN architecture may comprise a multi-scale input block and a multi-scale nested block. The multi-scale input block may be configured to receive input data and to generate a first downsampled input data set by downsampling the input data. The multi-scale nested block (Continued)

may comprise a first encoding layer configured to generate a first encoded data set by performing a convolution based on the input data. The multi-scale nested block may comprise a second encoding layer configured to generate a second encoded data set by performing a convolution based on the first downsampled input data set. Furthermore, the multi-scale nested block may comprise a first convolutional layer configured to generate a first output data set by upsampling the second encoded data set, concatenating the first encoded data set and the upsampled second encoded data set, and performing a convolution. The first convolutional layer may be nested between the encoding layers and decoding layers, thereby increasing the number of communication channels with the CNN and simplifying the underlying optimization problem.

19 Claims, 8 Drawing Sheets

(56) References Cited

U.S. PATENT DOCUMENTS

| | | | |
|---|---|---|---|
| 10,460,747 | B2 | 10/2019 | Roblek |
| 2018/0261214 | A1 | 9/2018 | Gehring |
| 2019/0251952 | A1 | 8/2019 | Arik |
| 2019/0279036 | A1 | 9/2019 | Pan |
| 2020/0027442 | A1 | 1/2020 | Mathur |
| 2020/0074271 | A1* | 3/2020 | Liang ............... G06V 10/82 |
| 2020/0160836 | A1 | 5/2020 | Chen |

OTHER PUBLICATIONS

Interspeech 2019, Sep. 15-19, 2019, Graz, Austria, Development of Emotion Rankers Based on Intended and Perceived Emotion Labels Zhenghao Jin, Houwei Cao.

Jha Debesh et al: "DoubleU-Net: A Deep Convolutional Neural Network for Medical Image Segmentation" , 2020 IEEE 33RD International Symposium on Computer-Based Medical Systems (CBMS), IEEE, Jul. 28, 2020 (Jul. 28, 2020), pp. 558-564, XP033817802, DOI: 10.1109/CBMS49503.2020.00111 [retrieved on Aug. 31, 2020] * section 3; figure 1 *.

K. Tan and D. Wang, "Complex spectral mapping with a convolutional recurrent network for monaural speech enhancement," in ICASSP 2019-2019 IEEE International Conference on Acoustics, Speech and Signal Processing (ICASSP). IEEE, 2019, pp. 6865-6869.

Liang-Chieh Chen et al: "DeepLab: Semantic Image Segmentation with Deep Convolutional Nets, Atrous Convolution, and Fully Connected CRFs", IEEE Transactions on Pattern Analysis and Machine Intelligence, vol. 40, No. 4, Apr. 1, 2018 (Apr. 1, 2018), pp. 834-848, XP055699398, USA ISSN: 0162-8828, DOI.

Liu Jia et al: "A Cascaded Deep Convolutional Neural Network for Joint Segmentation and Genotype Prediction of Brainstem Gliomas" , IEEE Transactions on Biomedical Engineering, IEEE Service Center, Piscataway, NJ, USA, vol. 65, No. 9, Sep. 1, 2018 (Sep. 1, 2018), pp. 1943-1952, XP011691463, ISSN: 0018-9294, DOI.

O. Ronneberger, P. Fischer, and T. Brox, "U-net: Convolutional networks for biomedical image segmentation," in International Conference on Medical image computing and computer-assisted intervention. Springer, 2015, pp. 234-241.

Xi Fang et al: "Multi-organ Segmentation over Partially Labeled Datasets with Multi-scale Feature Abstraction" , arxiv.org, Cornell University Library, 201 Olin Library Cornell University Ithaca, NY 14853, Jun. 6, 2020 (Jun. 6, 2020), XP081681686, * section III.A; figure 3; table 1 *.

Zhu Boqing et al: "Learning Environmental Sounds with Multi-scale Convolutional Neural Network", 2018 International Joint Conference on Neural Networks (IJCNN), IEEE, Jul. 8, 2018 (Jul. 8, 2018), pp. 1-8, XP033419444, DOI: 10.1109/IJCNN.2018.8489641 [retrieved on Oct. 10, 2018].

* cited by examiner

METHOD AND APPARTUS FOR AUDIO PROCESSING USING A NESTED CONVOLUTIONAL NEURAL NETWORK ARCHITECHTURE

CROSS-REFERENCE TO RELATED APPLICATION

This application is a U.S. National Stage of International Application No. PCT/US2021/055691, filed Oct. 19, 2021, which claims priority of the following priority applications: PCT international application PCT/CN2020/121829, filed 19 Oct. 2020, U.S. provisional application 63/112,220, filed 11 Nov. 2020, EP application 20211501.0, filed Dec. 3, 2020, PCT international application PCT/CN2021/078705, filed 2 Mar. 2021, and US provisional applicaiton 63/164, 028, filed 22 Mar. 2021, each of which is hereby incorporated by reference in its entirety.

TECHNOLOGY

The present disclosure relates generally to a method and apparatus for audio processing using a Convolutional Neural Network (CNN). More specifically, the present disclosure relates to extraction of speech from original noisy speech signals using an aggregated multi-scale nested CNN architecture. While some embodiments will be described herein with particular reference to that disclosure, it will be appreciated that the present disclosure is not limited to such a field of use and is applicable in broader contexts.

BACKGROUND

Any discussion of the background art throughout the disclosure should in no way be considered as an admission that such art is widely known or forms part of common general knowledge in the field.

Deep neural networks (DNNs) have emerged as a viable option for solving various kinds of audio processing problems. Types of DNNs include feedforward multilayer perceptrons (MLP), convolutional neural networks (CNNs), recurrent neural networks (RNNs), and generative adversarial networks (GANs). Among these, CNNs are a class of feedforward networks.

In recent years, CNN architectures have been adopted to the area of audio processing. In particular, CNN architectures have been successfully applied to various audio processing problems, including vocal separation, speech enhancement and speech source separation. Speech source separation aims at recovering target speech from background interferences and finds many applications in the field of speech and/or audio technologies. In this context, speech source separation is also commonly known as the "cocktail party problem". Challenges arise in this scenario in the extraction of dialog from professional content such as, for example, movie and TV due to the complex background.

It is an object of the present document to provide a novel CNN architecture which may be applied to various fields of audio processing, including vocal separation, speech enhancement and speech source separation.

SUMMARY

In accordance with a first aspect of the present disclosure, a computing system implementing a convolutional neural network (CNN) architecture is described. The CNN architecture may comprise a multi-scale input block and a multi-scale nested block. The multi-scale input block may be configured to receive input data and to generate a first downsampled input data set by downsampling the input data. The multi-scale nested block may comprise a first encoding layer configured to generate a first encoded data set by performing a convolution based on the input data. The multi-scale nested block may comprise a second encoding layer configured to generate a second encoded data set by performing a convolution based on the first downsampled input data set. Furthermore, the multi-scale nested block may comprise a first convolutional layer configured to generate a first output data set by performing a convolution based on the first encoded data set and an upsampled second encoded data set, wherein the upsampled second encoded data set is obtained by upsampling the second encoded data set. For example, the first convolutional layer may be configured to generate the first output data set by upsampling the second encoded data set, concatenating the first encoded data set and the upsampled second encoded data set, and performing a convolution based on a result of the concatenation of the first encoded data set and the upsampled second encoded data set. Alternatively, the upsampling and/or concatenating may be performed by some other layer or unit, e.g. by the first encoding layer or by the second encoding layer. The first convolutional layer may be nested between the encoding layers and decoding layers, thereby increasing the number of communication channels within the CNN and simplifying the underlying optimization problem.

The input data may represent an audio signal. For example, the input data may comprise a spectrum of an audio signal which extends along a time dimension and a frequency dimension. The multi-scale input block may then be configured to perform the described downsampling operation by either downsampling said spectrum with regard to the time dimension, or by downsampling said spectrum with regard to the frequency dimension. Alternatively, the multi-scale input block may be configured to perform the described downsampling operation by downsampling said spectrum both with regard to the time dimension and the frequency dimension. As will be described in the following description, the multi-scale input block may be configured to generate further downsampled versions of the input data and, thus, to generate multiple scales of the original input data which are forwarded to the multi-scale nested block for further processing.

In the multi-scale nested block, the encoding and convolutional layers may be identical or different. They may e.g. comprise a single convolutional layer or a plurality of convolutional layers whose outputs are aggregated or added in an arbitrary manner. Each convolution operation may be e.g. a 2D convolution and may be followed by a suitable activation function. A convolutional layer may have a number of filters. The filter sizes of the encoding and convolutional layers may be different. The filters may be initialized with random weights and the weights may be trained during a training procedure. The training procedure may both include a forward propagation process and a backpropagation process. The data sets generated by the encoding and convolutional layers may also be denoted as features maps within this document.

The multi-scale nested block may further comprise a second convolutional layer configured to generate a second output data set by performing a convolution based on the second encoded data set. The multi-scale nested block may further comprise a third convolutional layer configured to generate a third output data set by performing a convolution based on the first output data set and an upsampled second output data set, wherein the upsampled second output data set is obtained by upsampling the second output data set. For example, the third convolutional layer may be configured to generate the third output data set by upsampling the second output data set, concatenating the first output data set and the upsampled second output data set, and performing the convolution based on a result of the concatenation of the first output data set and the upsampled second output data set.

The third convolutional layer may be also denoted/regarded as first decoding layer, and the third output data set may be denoted as first decoded data set. In other words, the first decoded data set may represent a decoded data set which is at the same scale as the input data. Analogously, the second convolutional layer may be also denoted as second decoding layer, and the second output data set may be denoted as second decoded data set. That is, the second decoded data set may represent a decoded data set which is at a lower scale compared to the input data, or more precisely: at the scale of first downsampled input data set. Thus, according to the forgoing interpretation of the described CNN architecture, the first convolutional layer is coupled in between the two encoding layers and the two decoding layers and may, as a consequence, be also denoted as nested (or intermediate) convolutional layer. As such, the presence of this nested convolutional layer enables increased communication within the proposed CNN architecture. In particular, the introduction of the nested convolutional layer brings the semantic level of the encoded data sets (e.g. encoder feature maps) closer to the semantic level of decoded data sets (e.g. decoder feature maps). The technical advantage is that an optimizer may face an easier optimization problem when the received encoded data sets and the corresponding decoded data sets are semantically more similar.

From a network perspective, the first encoding layer, the first convolutional layer, and the third convolutional layer (i.e. the first decoding layer) may be configured to process and output data sets at the same scale as the input data. The latter three layers may form a first floor of the multi-scale nested block. Similarly, the second encoding layer and the second convolutional layer (i.e. the second decoding layer) may be configured to process and output data sets at the same scale as the first downsampled input data set. The latter two layers may form a second floor of the multi-scale nested block. Therefore, also the proposed CNN architecture may be denoted as "nested" since (a) the first convolutional layer is located between different layers of the first floor. In conventional CNN architectures, such intermediate layers are typically not provided and the output of an encoder is directly forwarded to the corresponding decoder on the same floor. Moreover, the proposed CNN architecture may be denoted as "nested" since (b) the first convolutional layer establishes a connection (with additional convolutional processing) between different floors. For example, the first convolutional layer may perform some additional convolutional processing between the second encoding layer (on the second floor) and the third convolutional layer (on the first first), wherein this additional convolutional processing is typically not provided in state of the art architectures. Put differently, the multi-scale nested block may comprise a plurality of floors, each floor associated with a respective resolution of its input data, wherein a number of (serial) layers decreases by one from one floor to the next.

The multi-scale input block may be further configured to generate a second downsampled input data set by downsampling the first downsampled input data set. The multi-scale nested block may further comprise a third encoding layer configured to generate a third encoded data set by performing a convolution based on the second downsampled input data set. Further, the second convolutional layer may be configured to generate the second output data set by performing a convolution based on the second encoded data set and an upsampled third encoded data set, wherein the upsampled third encoded data set is obtained by upsampling the third encoded data set. For example, the second convolutional layer may be configured to generate the second output data set by upsampling the third encoded data set, concatenating the second encoded data set and the upsampled third encoded data set, and performing the convolution based on the concatenation of the second encoded data set and the upsampled third encoded data set.

The second encoding layer may be configured to generate the second encoded data set by performing a convolution based on the first downsampled input data set and a downsampled first encoded data set, wherein the downsampled first encoded data set is obtained by downsampling the first encoded data set. For instance, the second encoding layer may be further configured to downsample the first encoded data set, to concatenate the first downsampled input data set and the downsampled first encoded data set, and to generate the second encoded data set by performing the convolution based on the latter concatenation.

Alternatively or additionally, the third encoding layer may be configured to downsample the second encoded data set, to concatenate the second downsampled input data set and the downsampled second encoded data set, and to generate the third encoded data set by performing the convolution based the latter concatenation, i.e. the concatenation of the second downsampled input data set and the downsampled second encoded data set.

In comparison to the above-described CNN architecture where the second encoding layer is not configured to receive and downsample the output of the first encoding layer, and where the third encoding layer is not configured to receive and downsample the output of the second encoding layer, the CNN architecture with corresponding reception and downsampling functionality is less aggressive when attempting to solve the underlying optimization problem.

The second convolutional layer may be configured to generate the second output data set by performing a convolution based on the second encoded data set, a downsampled first output data set, and an upsampled third encoded data set, wherein the downsampled first output data set is obtained by downsampling the first output data set and the upsampled third encoded data set is obtained by upsampling the third encoded data set. For instance, the second convolutional layer may be configured to generate the second output data set by downsampling the first output data set, upsampling the third encoded data set, concatenating the downsampled first output data set, the upsampled third encoded data set and the second encoded data set, and performing the convolution based the latter concatenation.

The third convolutional layer may be configured to generate the third output data set by performing a convolution based on the first output data set, an upsampled second output data set, and the first encoded data set, wherein the upsampled second output data set is obtained by upsampling the second output data set. For instance, the third convolutional layer may be configured to generate the third output data set by upsampling the second output data set, concatenating the first output data set, the upsampled second output data set and the first encoded data set, and performing the convolution based on the latter concatenation.

The third encoding layer may be configured to generate the third encoded data set by performing a convolution based on the second downsampled input data set, a downsampled first encoded data set, and a downsampled second encoded data set, wherein the downsampled first encoded data set is obtained by downsampling the first encoded data set and the downsampled second encoded data set is obtained by downsampling the second encoded data set. For example, the third encoding layer may be configured to generate the third encoded data set by downsampling the first encoded data set, downsampling the second encoded data set, concatenating the downsampled first encoded data set, the downsampled second encoded data set and the second downsampled input data set, and performing the convolution based on the latter concatenation.

The computing system may further comprise a weighted adding block configured to apply a first weight to the third output data set. The weighted adding block may be configured to apply a second weight to the second output data set. The weighted adding block may be configured to generate an output of the multi-scale nested block by adding the weighted third output data set and the weighted second output data set. The first and/or the second weight may be learnable parameters or may be set based on signal processing domain knowledge.

The first encoding layer may be configured to generate the first encoded data set by performing a convolution based on the input data and upsampled first downsampled input data set, wherein the upsampled first downsampled input data set is obtained by upsampling the first downsampled input data set. For example, the first encoding layer may be configured to generate the first encoded data set by upsampling the first downsampled input data set, concatenating the upsampled first downsampled input data set and the input data, and performing the convolution based on the latter concatenation.

Alternatively or additionally, the second encoding layer may be configured to generate the second encoded data set by performing a convolution based on the first downsampled input data set and an upsampled second downsampled input data set, wherein the upsampled second downsampled input data set is obtained by upsampling the second downsampled input data set. For example, the second encoding layer is configured to generate the second encoded data set by upsampling the second downsampled input data set, concatenating the upsampled second downsampled input data set and the first downsampled input data set, and performing the convolution based on the latter concatenation.

The multi-scale input block may comprise a convolutional layer or a dense layer configured to generate the first downsampled input data set based on the input data. The parameters of said convolutional layer or said dense layer may be trainable during a training process. The multi-scale input block may be configured to generate the first downsampled input data set using maximum pooling processing, average pooling processing, or a mixture of maximum and average pooling processing.

The first encoding layer or the second encoding layer may comprise a multi-scale convolutional block configured to generate an output by concatenating or adding outputs of at least two parallel convolution paths. The multi-scale convolutional block may be configured to weight the outputs of the at least two parallel convolution paths using different weights. Again, the weights may be based on trainable parameters learned from a training process.

Each parallel convolution path of the multi-scale convolutional block may include L convolution layers, wherein L is a natural number >1, and wherein an l-th layer among the L layers has Nl filters with l=1 ... L. For each parallel convolution path, the number Nl of filters in the l-th layer may be increasing with increasing layer number l. For example, for each parallel convolution path, the number Nl of filters in the l-th layer may be given by Nl=l*N0, wherein N0 is a predetermined constant >1. On the one hand, a filter size of the filters may be the same within each parallel convolution path. On the other hand, a filter size of the filters may be different between different parallel convolution paths. For a given parallel convolution path, the filters of at least one of the layers of the parallel convolution path may be dilated 2D convolutional filters. The dilation operation of the filters of the at least one of the layers of the parallel convolution path may be performed on the frequency axis only.

For a given parallel convolution path, the filters of two or more of the layers of the parallel convolution path may be dilated 2D convolutional filters, and a dilation factor of the dilated 2D convolutional filters may increase exponentially with increasing layer number l. For example, for a given parallel convolution path, a dilation may be (1,1) in a first of the L convolution layers, the dilation may be (1,2) in a second of the L convolution layers, the dilation may be $(1,2^{(l-1)})$ in the l-th of the L convolution layers, and the dilation may be $(1,2^{(L-1)})$ in the last of the L convolution layers, where (c,d) indicates a dilation factor of c along the time axis and a dilation factor of d along the frequency axis.

As already indicated in the forgoing description, the input data may include an audio signal. The CNN architecture may further comprise an aggregation block configured to receive an output of the multi-scale nested block. This aggregation block may comprise at least one of a convolutional layer configured to reduce a channel number associated with the input data, a pooling layer configured to reduce a dimension associated with the input data, and a recurrent layer configured to sequence the output of the multi-scale nested block.

The CNN architecture may be further extended according to the above described principles. For instance, the multi-scale input block may be further configured to generate a third downsampled input data set by downsampling the second downsampled input data set. The multi-scale nested block may further comprise a fourth encoding layer configured to generate a fourth encoded data set by performing a convolution based on the third downsampled input data set. The multi-scale nested block may further comprise a fourth convolutional layer configured to generate a fourth output data set by performing a convolution based on the third encoded data set and an upsampled fourth encoded data set, wherein the upsampled fourth encoded data set is obtained by upsampling the fourth encoded data set. For example, the fourth convolutional layer may be configured to generate the fourth output data set by upsampling the fourth encoded data set, concatenating the third encoded data set and the upsampled fourth encoded data set, and performing the convolution based on the result of the latter concatenation. The multi-scale nested block may further comprise a fifth convolutional layer configured to generate a fifth output data set by performing a convolution based on the second output data set and an upsampled fourth output data set, wherein the upsampled fourth output data set is obtained by upsampling the fourth output data set. For example, the fifth convolutional layer may be configured to generate the fifth output data set by upsampling the fourth output data set, concatenating the second output data set and the upsampled fourth output data set, and performing said convolution based on the result of the latter concatenation. The multi-scale nested block may further comprise a sixth convolutional layer configured to generate a sixth output data set by performing a convolution based on the third output data set and an upsampled fifth output data set, wherein the upsampled fifth output data set is obtained by upsampling the fifth output data set.

In the described CNN architecture, three convolutional layers may be regarded as nested layers: the first, the second, and the third convolutional layer. The latter layers are coupled in between the three encoding layers and the three decoding layers. Moreover, the first encoding layer, the first, the third, and the sixth convolutional layer are at a first scale, i.e. at the scale of the input data. Similarly, the second encoding layer, the second, and the fifth convolutional layer are at a second scale, i.e. at the scale of the first downsampled input data. Finally, at a third scale, there are only two layers, i.e. the third encoding layer and the fourth convolutional layer. At a fourth scale, the fourth encoding layer constitutes the only layer. In general, the CNN architecture can be further extended according to the above-described pyramid-shaped structure. At this, the number of layers per scale depends on the number downsampled input data sets provided by the multi-scale input block.

In accordance with a second aspect of the present disclosure, there is provided an apparatus for audio processing. The apparatus may be configured to receive input of an input audio signal and output an output audio signal. The apparatus may comprise a CNN architecture described within the present document. The input data received by the multiscale input block may be based on the input audio signal, and the output audio signal may be based on the third output data set generated by the third convolutional layer of the multi-scale nested block.

In accordance with a third aspect of the present disclosure, there is provided a method of audio processing using a convolutional neural network CNN. The method may comprise receiving input data. The method may comprise generating a first downsampled input data set by downsampling the input data. The method may comprise generating a first encoded data set by performing a convolution based on the input data. The method may comprise generating a second encoded data set by performing a convolution based on the first downsampled input data set. The method may comprise generating a third output data set by performing a convolution based on the first output data set and an upsampled second output data set, wherein the upsampled second output data set is obtained by upsampling the second output data set.

The method may further comprise generating a second output data set by performing a convolution based on the second encoded data set. The method may further comprise generating a first output data set by performing a convolution based on the first encoded data set and an upsampled second encoded data set, wherein the upsampled second encoded data set is obtained by upsampling the second encoded data set.

In accordance with a fourth aspect of the present disclosure, there is provided a computer program product comprising a computer-readable storage medium with instructions adapted to cause a device to carry out the above-described method when executed by a device having processing capability.

BRIEF DESCRIPTION OF THE DRAWINGS

Example embodiments of the disclosure will now be described, by way of example only, with reference to the accompanying drawings in which.

DESCRIPTION OF EXAMPLE EMBODIMENTS

The present document discloses an aggregated multi-scale nested neural network architecture called AMS-Nest. The proposed architecture may be regarded as a deeply-supervised encoder-decoder network where the encoder and decoder sub-networks are connected through a series of nested pathways. At this, the encoder may comprise the layers that encode the original input to a specific space or dimension to obtain coded features. The decoder may comprise the layers that decode the coded features to the original space or dimension.

Figure 1:
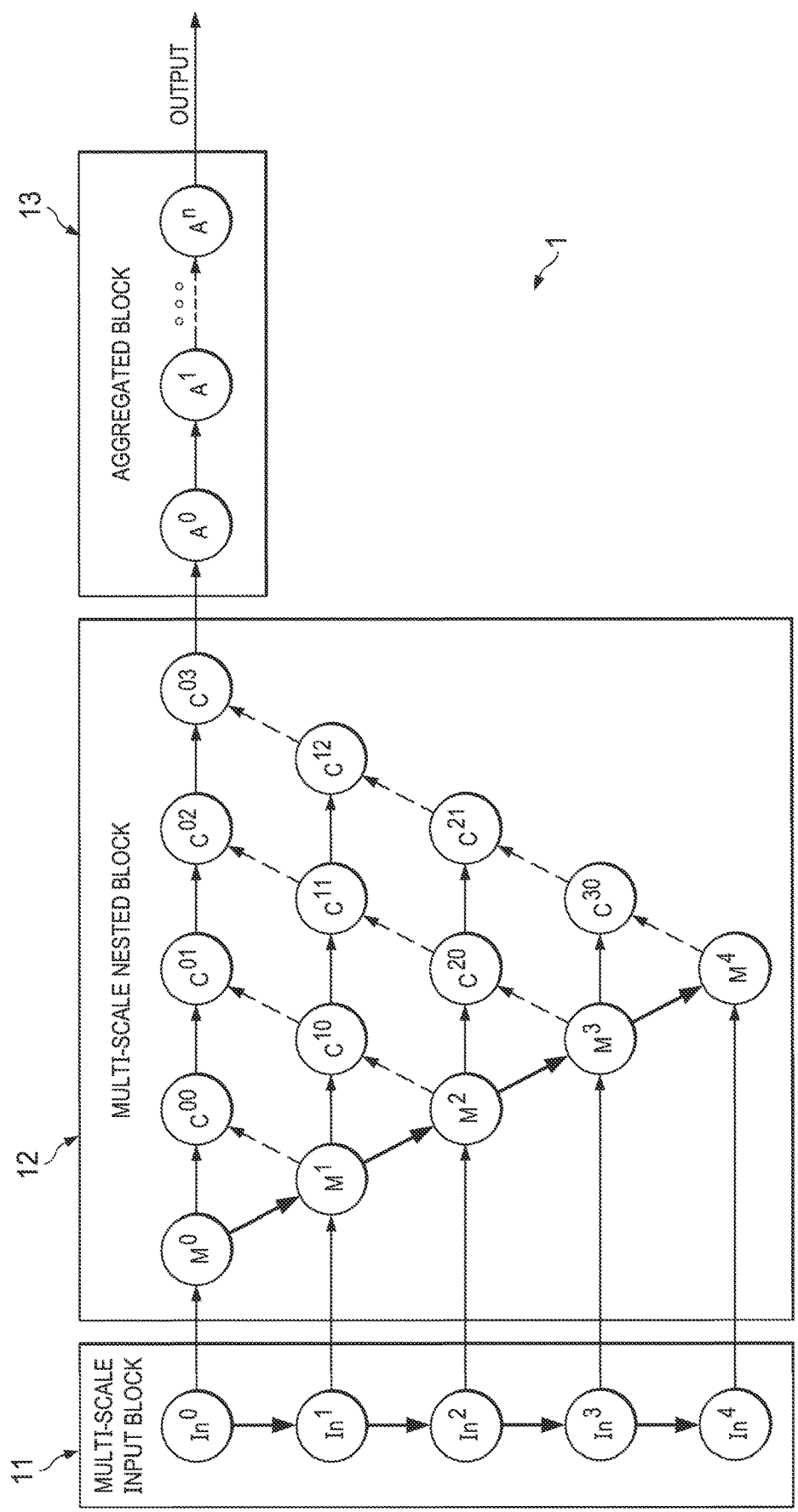
FIG. 1 illustrates an exemplary architecture of an AMS-Nest.

FIG. 1 illustrates an exemplary architecture 1 of an AMS-Nest. The architecture 1 basically comprises three main blocks which are called multi-scale input block 11, multi-scale nested block 12, and aggregated block (aggregation block) 13. FIG. 1 shows the model structure of AMS-Nest with a depth of five. In FIG. 1, and in all forthcoming figures, horizontal arrows indicate that a feature map is forwarded from the output of a layer to the input of another layer. Arrows pointing downwards (in particular in an angle of 90 degree downwards within the multi-scale input block 11 and in an angle of 45 degree downwards in the multi-scale nested block 12) indicate that a feature map is downsampled. The feature map may be downsampled by the layer that outputs the feature map, by the layer that receives the feature map, or by a third layer or entity. Arrows pointing upwards (in particular in an angle of 45 degree upwards in the multi-scale nested block 12) indicate that a feature map is upsampled. Again, the feature map may be upsampled by the layer that outputs the feature map, by the layer that receives the feature map, or by a third layer or entity.

The multi-scale input block 11 will downsample the original input to several scales, the multi-scale nested block 12 will use different filter sizes to capture the features based on the multi-scale input and each scale of the input will correspond to a separate horizontal path. Moreover, the paths may be tightly connected. The aggregated block 13 will shrink the channel number and dimension to match the target shape. By removing the bottom block ($In^4$, $M^4$, $C^{30}$, $C^{21}$, $C^{12}$, $C^{03}$), the depth of the AMS-Nest can be reduced to four. After similar removal of further layers, the depth of the AMS-Nest may be reduced to three or even two. In this disclosure, the number of horizontal paths is defined as the floor of the AMS-Nest. Therefore, the structure shown in FIG. 1 may be denoted a 5-floor based AMS-Nest.

The multi-scale input block 11 generates a first downsampled input data set $In^1$ and a second downsampled input data set $In^2$. The multi-scale nested block 12 comprises e.g. a first encoding layer $M^0$ which generates a first encoded data set by performing a convolution based on the input data $In^0$. The multi-scale nested block 12 further comprises e.g. a second encoding layer $M^1$, third encoding layer $M^2$, a first convolutional layer $C^{00}$, a second convolutional layer $C^{10}$, and a third convolutional layer $C^{01}$.

Multi-Scale Input Block

The multi-scale input block 11 may contain multiple scales of the original input. As shown in FIG. 1, $In^1$ to $In^4$ are four scales of the original input $In^0$, and the arrows represent the downsampling processing. The downsampling process can be achieved in several different ways.

Option 1: Using Neural Layers

Convolutional layers can be used as a downsampling layer by using different stride step, and dense layers can also be applied by using a smaller number of nodes than the original input. For the convolutional layer based multi-scale input block, the $i_{th}$ input can be represented by $$In^i = \text{Conv2D}(\text{channel, kernel, stride, dilation})(In^{i-1}), \quad i \geq 1$$

where Conv2D (channel, kernel, stride, dilation) (·) represents the 2D convolution layer. The channel, kernel, stride and dilation are four main parameters in a convolution layer, and we can use stride >1 to reduce the dimension of the previous input. Other parameters can be determined based on different use cases. For downsampling, a single or multiple convolutional layers may be used.

For the dense layer based multi-scale input block, the $i_{th}$ input can be represented by $$In^i = \text{Dense}(node^i)(In^{i-1}), i \geq 1$$

Where $node^i$ is the node number of the dense layer, and $node^i < node^{i-1}$. A single or multiple dense layers may be used for downsampling.

Option2: Using Pooling Processing

Pooling processing can be used to downsample the original input to different rates by using a different step, and we propose several pooling options. For example, LP pooling may be used:

$$In^{f+1}_{i,j} = \left[ \sum_{(m,n) \in R_{i,j}} (In^f_{m,n})^p \right]^{1/p}$$

where $In_{i,j}^{f+1}$ is the input of $(f+1)_{th}$ floor, i.e., the output of the pooling operator at location (i, j), and $In_{m,n}^f$ is the feature value at location (m, n) within the pooling region $R_{i,j}$ of $f_{th}$ floor. Specially, when parameter p=1, $L_p$ corresponds to the average pooling and when parameter p=∞, $L_p$ corresponds to the max pooling.

Or, mixed pooling may be used:

$$In^{f+1}_{i,j} = \lambda \max_{(m,n) \in R_{i,j}} In^f_{m,n} + (1-\lambda) \frac{1}{R_{i,j}} \sum_{m,n \in R_{i,j}} In^f_{m,n}$$

where λ is a random value (can be chosen arbitrary) being either 0 or 1 which indicates the choice of whether using average pooling or max pooling. During forward propagation process, λ is recorded and may be used for the backpropagation operation.

Multi-Scale Nested Block

In the proposed nested CNN architecture, the feature maps of the encoder (i.e. of the encoding layers $M^0$, $M^1$, ... ) undergo one or more convolution layers, wherein the number of convolution layers depends on the pyramid level (see FIG. 1). For example, the pathway between nodes $M^0$ and $C^{03}$ consists of a convolution block with three convolution layers ($C^{00}$, $C^{01}$, $C^{02}$), wherein each convolution layer may be preceded by a concatenation layer that fuses the output from the previous convolution layer of the same block with the corresponding up-sampled output of the lower floor block. Essentially, the nested (or intermediate) convolution blocks bring the semantic level of the encoder feature maps closer to that of the feature maps awaiting in the decoder. In FIG. 1, the decoder may be said to comprise layers ($C^{30}$, $C^{21}$, $C^{12}$, ... $C^{03}$). The technical advantage is that the optimizer faces an easier optimization problem when the received encoder feature maps and the corresponding decoder feature maps are semantically more similar.

Figure 2:
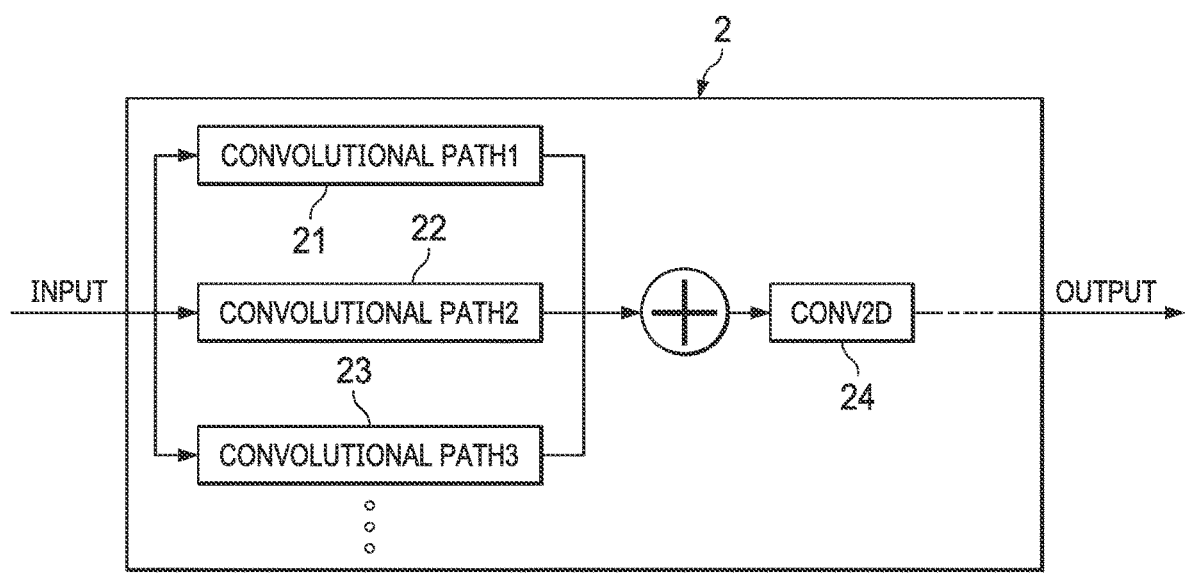
FIG. 2 illustrates an exemplary multi-scale convolutional block M.

In general, the nodes in the multi-scale nested block 12 contain two types: type M and type C. Type M may for example comprise a multi-scale convolutional block 2 which is shown in FIG. 2. The multi-scale convolutional block 2 generate an output by concatenating or adding outputs of at least two parallel convolution paths 21, 22, 23. While the number of parallel convolution paths is not limited, the aggregated multi-scale CNN may include three parallel convolution paths 21, 22, 23. By means of these parallel convolution paths, the extraction of local and general feature information of the time-frequency transform of the multiple frames of the audio signal is possible in different scales. The output of the parallel convolution paths is aggregated and undergoes a further 2D convolution 24.

It should be mentioned that the word "multi-scale" in the term multi-scale convolutional block 2 has a different meaning than in the terms multi-scale input block 11 and multi-scale nested block 12. On the one hand, in the term multi-scale convolutional block 2, the word "multi-scale" indicates that different filter sizes may be used in each parallel convolution path. On the other hand, in the terms multi-scale input block 11 and multi-scale nested block 12, the word "multi-scale" indicates that—on each floor—input data with different size/resolution is processed. In particular, compared to the floor above, a lower floor may process input data which is downsampled e.g. with a factor of 2 compared to the floor above.

Type C represents e.g. a common convolutional layer where different kernel and dilation rates can be set. It should be noted that type C and type M may be the same or different. A type C layer may comprise any convolution blocks. In the simplest case, a type C layer may only comprise a single convolution operation.

Figure 3:
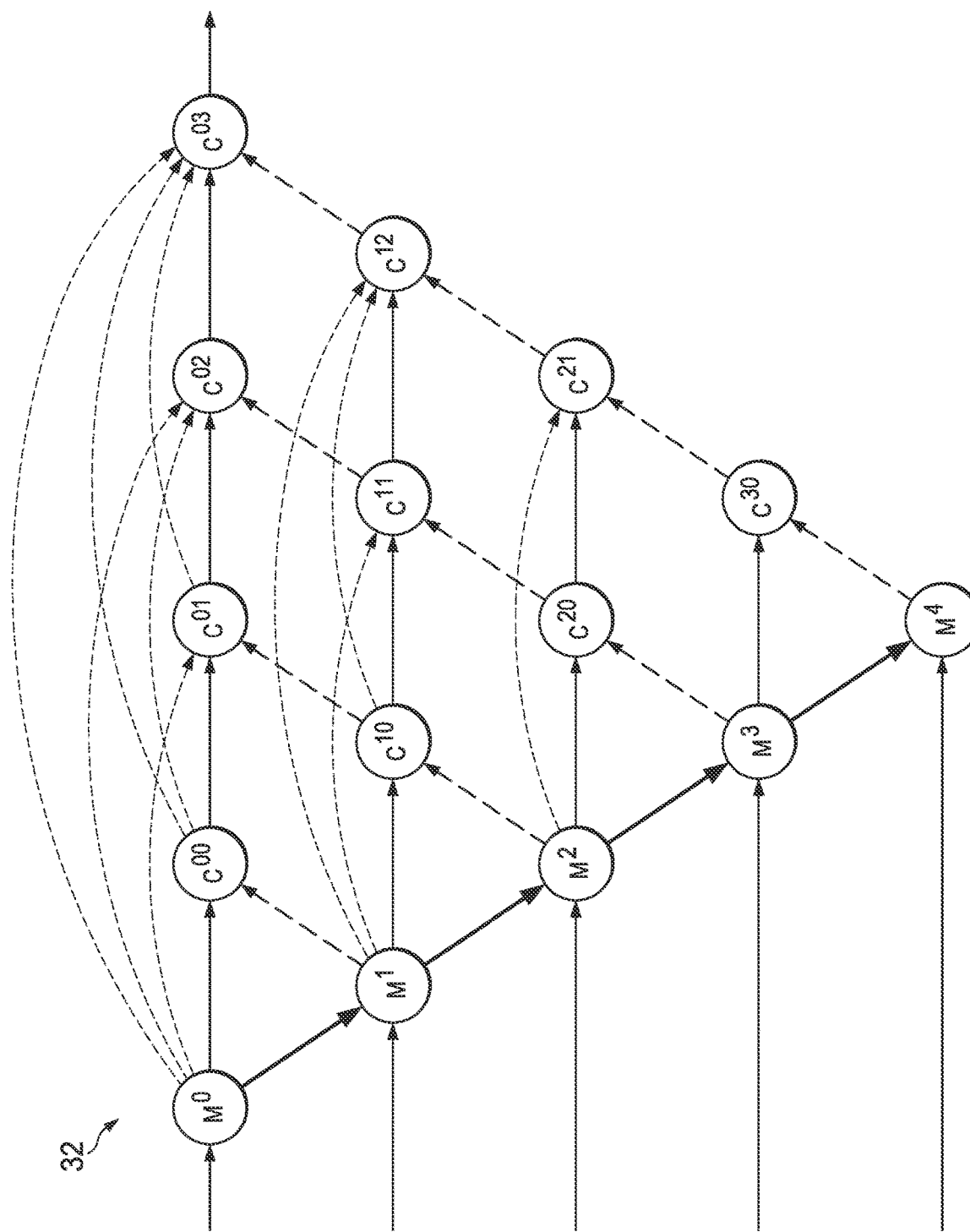
FIG. 3 illustrates an exemplary horizontally dense multi-scale nested block.

FIG. 3 illustrates an exemplary horizontally dense multi-scale nested block 32 which may replace the multi-scale nested block 12 in FIG. 1. To make the nested blocks be more powerful, the concept of dense convolutional layers may be applied in this example. As shown in FIG. 3, we can add several skip connections in the nested block 12. The dashed arrows indicate the corresponding concatenation processing. For example, in FIG. 3, a third convolutional layer C01 generates a third output data set by performing a convolution based on a first output data set generated by layer C00, an upsampled second output data set originating from layer C10, and a first encoded data set originating from layer M0. In other words, in the horizontally dense architecture, the first encoded data set bypasses layer C00 and is directly forwarded to layer C01. In addition, the first encoded data set may also be forwarded to layers C00, C02, and C03.

Formally, we formulate the skip pathway as follows: let $c^{i,j}$ idenote the output of node $C^{i,j}$, $m^i$ denotes the output of $M^i$, where i indexes the down-sampling layer along the encoder (i.e., the floor number) and j indexes the convolution layer of the dense block along the skip pathway. The stack of feature maps represented by $c^{i,j}$ may be computed as $$c^{i,j} = \begin{cases} H([m^i, U(m^{i+1})]), & j = 0 \\ H([m^i, [c]_{k=0}^{j-1}, U(c^{i+1,j-1})]), & j > 0 \end{cases}$$

where function H(·) is a convolution operation followed by an activation function, U(·) denotes an upsampling layer, and [·] denotes the concatenation layer. Basically, the C nodes at level j=0 may only receive two inputs, both from the encoder sub-network but at two consecutive levels. Nodes at level j>0 receive j+2 inputs, of which j inputs are the outputs of the previous j nodes in the same skip pathway and the last input is the up-sampled output from the lower skip pathway. The reason why all prior feature maps accumulate and arrive at the current node is because we may make use of a dense convolution block along each skip pathway.

Figure 4:
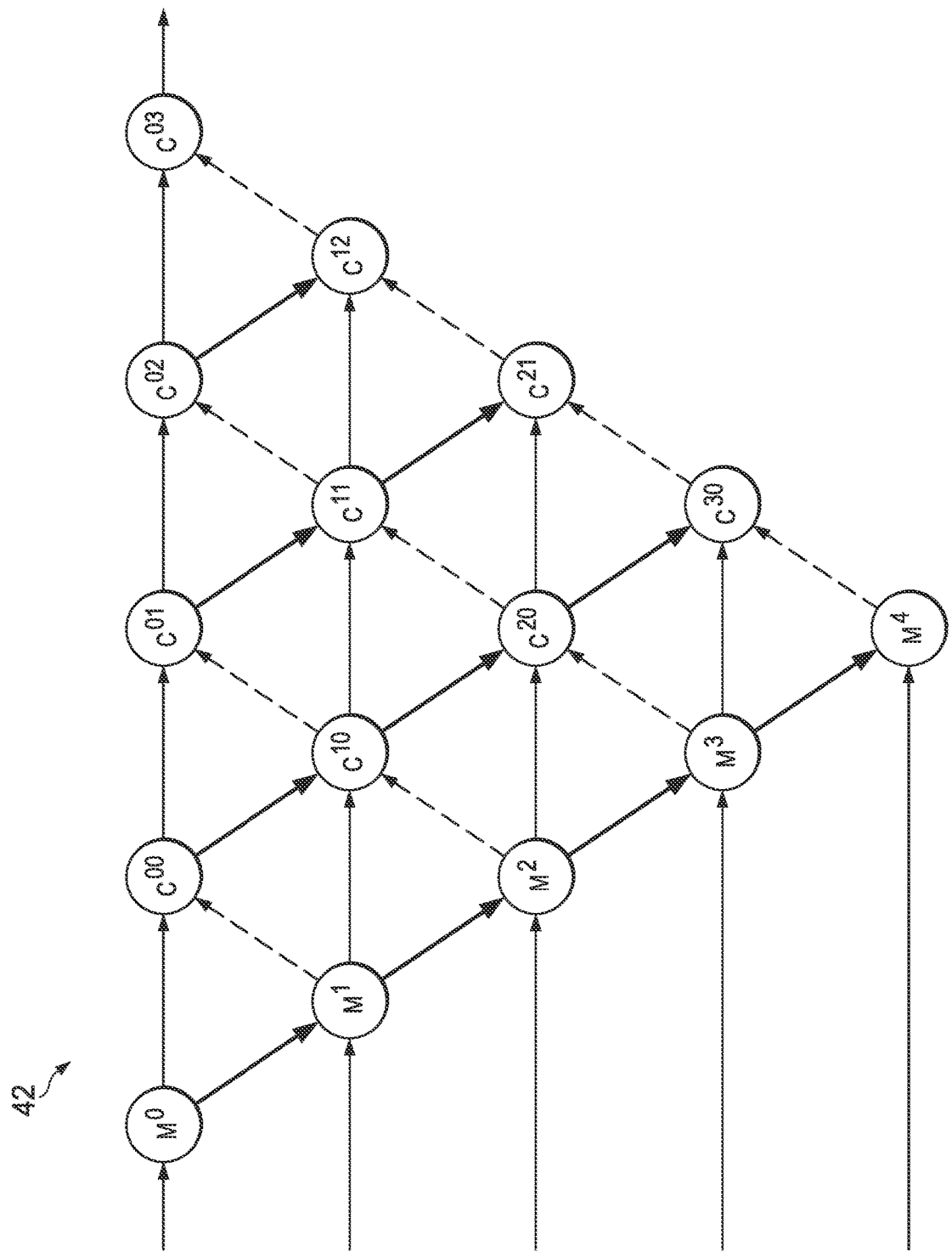
FIG. 4 illustrates an exemplary vertically concatenated multi-scale nested block.
Figure 5:
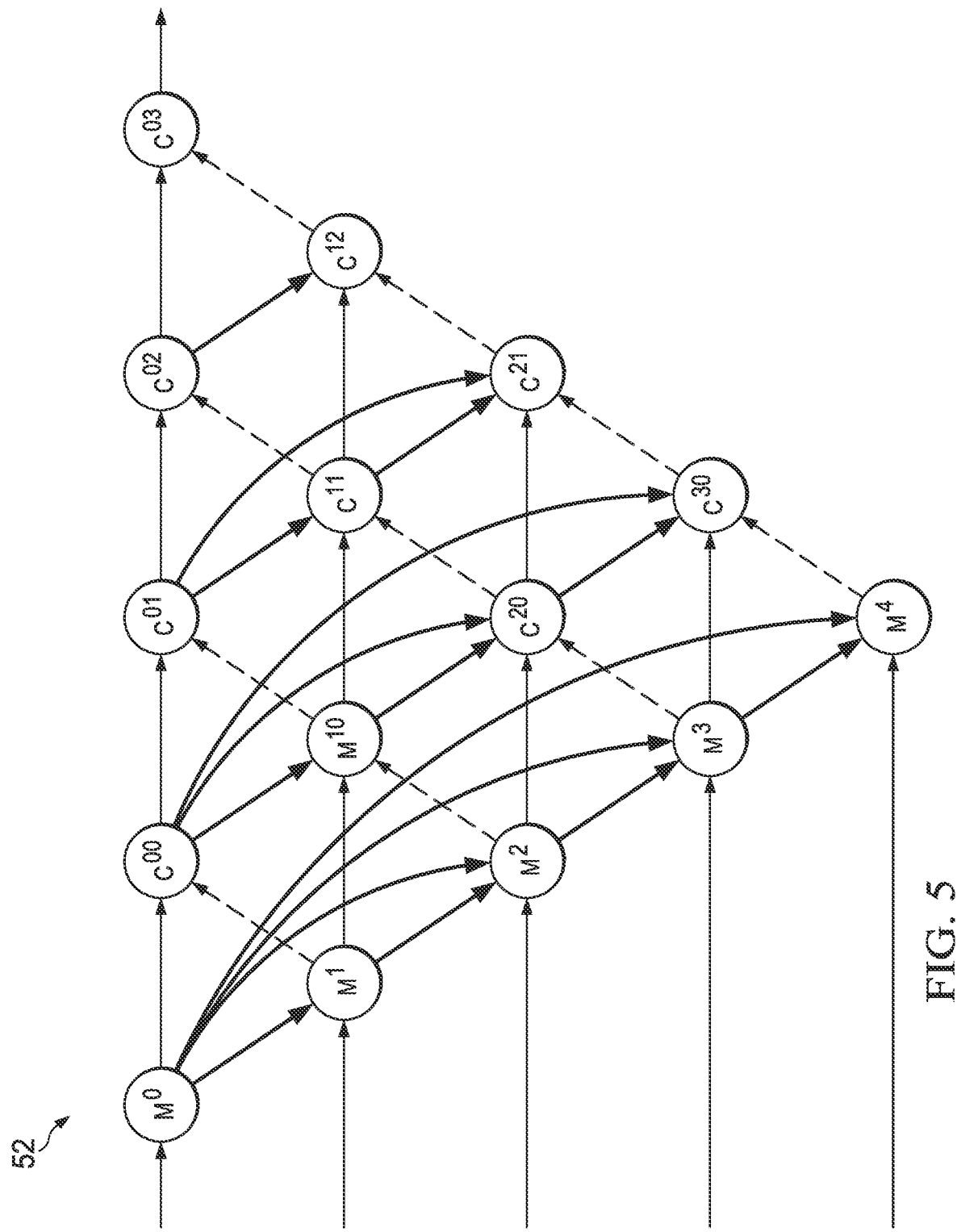
FIG. 5 illustrates an exemplary vertically dense multi-scale nested block.

FIG. 4 illustrates an exemplary vertically concatenated multi-scale nested block 42 which may replace the multi-scale nested block 12 in FIG. 1. In this example, the second convolutional layer $C^{10}$ generates the second output data set by performing a convolution based on the second encoded data set originating form layer $M^1$, the downsampled first output data set from layer $C^{00}$, and an upsampled second encoded data set from layer $M^2$. That is, the output of layer $C^{00}$ is explicitly downsampled and forwarded to layer $C^{10}$. As can be seen from FIG. 4, an upsampled version of the second output data set may be sent to node $C^{10}$ and a downsampled version of the second output data may be sent to node $C^{20}$. FIG. 5 illustrates an exemplary vertically dense multi-scale nested block 52 which may replace the multi-scale nested block 12 in FIG. 1. In FIG. 5, the additional downsampling processing is illustrated using curved downward arrows. At this, the third encoding layer $M^2$ generates the third encoded data set by performing a convolution based on the second downsampled input data set, a downsampled first encoded data set originating from layer $M^1$, and a downsampled second encoded data set originating from layer $M^0$.

Figure 6:
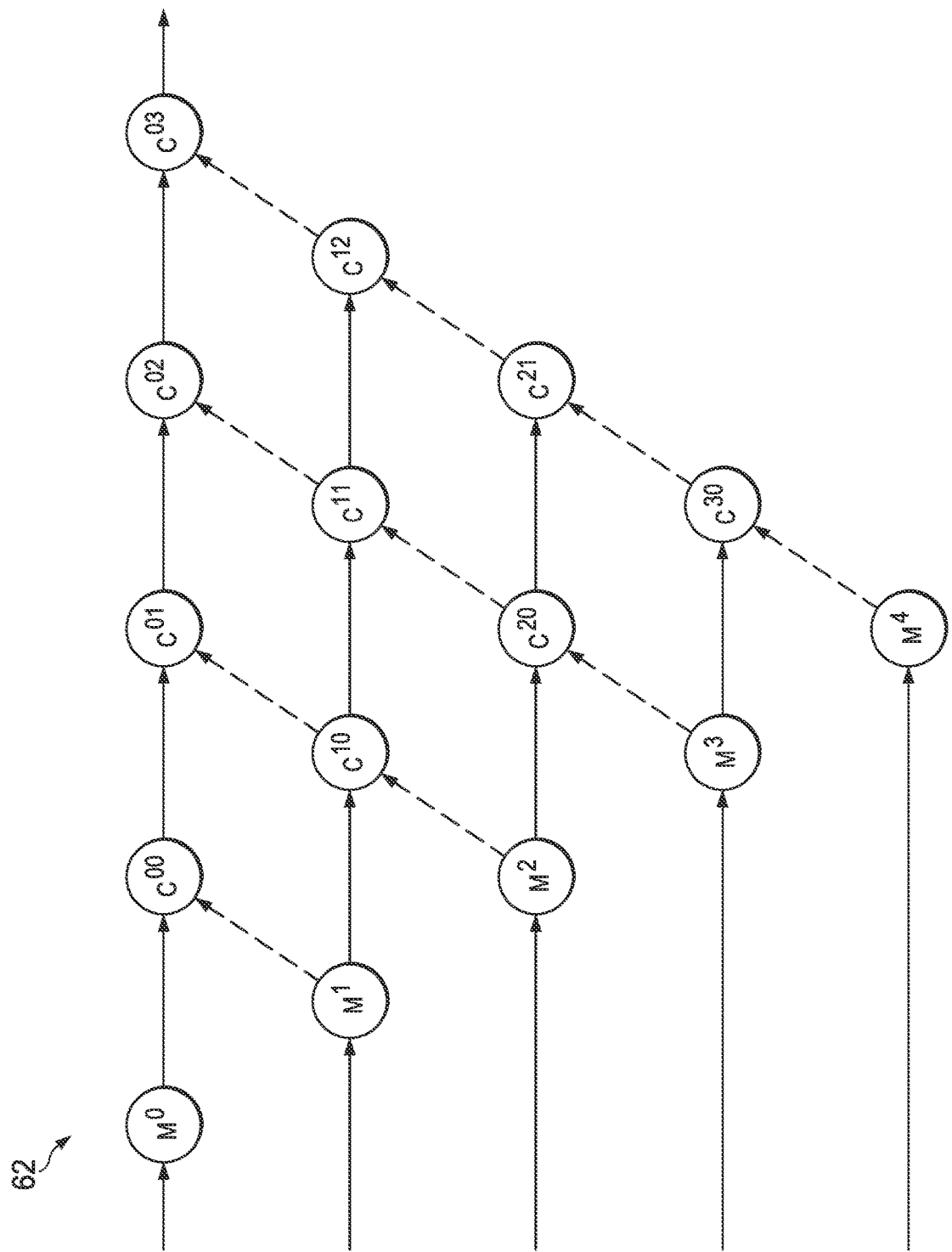
FIG. 6 illustrates an exemplary architecture of an AMS-Nest with removed connections between the M blocks.

FIG. 6 illustrates an exemplary architecture of an AMS-Nest 62 with removed connections between the M blocks. Again, the block shown in FIG. 6 may replace the multi-scale nested block 12 in FIG. 1. The first encoding layer $M^0$ generates a first encoded data set by performing a convolution based on the input data, the second encoding layer $M^1$ generates a second encoded data set by performing a convolution based on the first downsampled input data set, and the first convolutional layer $C^{00}$ generates a first output data set by performing a convolution based on the first encoded data set and an upsampled second encoded data set. The second convolutional layer $C^{10}$ generates a second output data set by performing a convolution based on the second encoded data set. The third convolutional layer $C^{01}$ generates a third output data set by performing a convolution based on the first output data set and an upsampled second output data set, wherein the upsampled second output data set is obtained by upsampling the second output data set.

Figure 7:
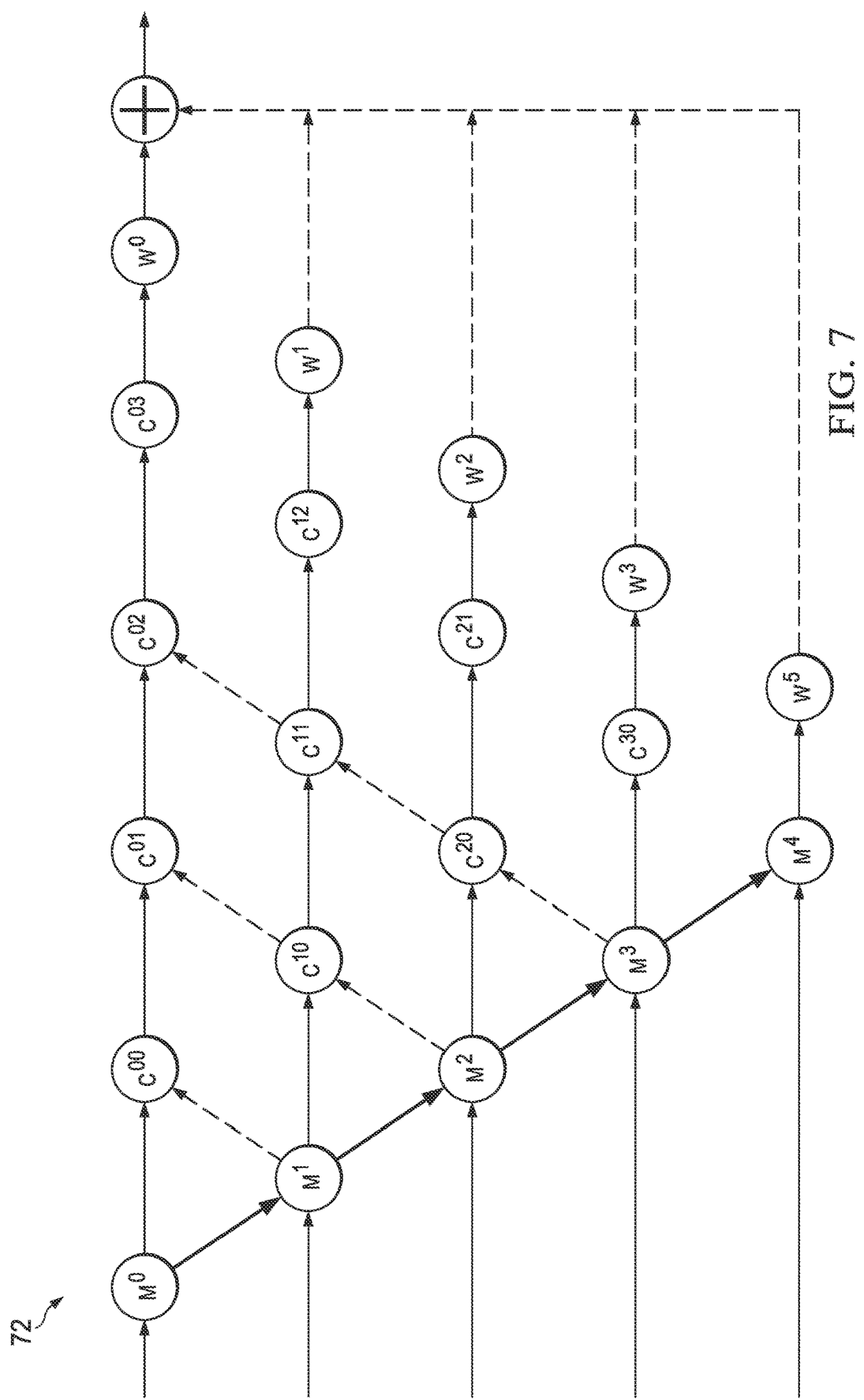
FIG. 7 illustrates an exemplary architecture of an AMS-Nest with weighting.

FIG. 7 illustrates another exemplary architecture 72 with weighting for the multi-scale nested block 12 in FIG. 1. We can set different weights at each floor in the multi-scale nested block. The weights can be either set based on signal processing domain knowledge or learnable parameter. The depicted CNN architecture comprises a weighted adding block configured to apply a first weight $W^0$ to the third output data set, apply a second weight $W^1$ to the second output data set, and generate an output of the multi-scale nested block based on the weighted third output data set and the weighted second output data set.

Figure 8:
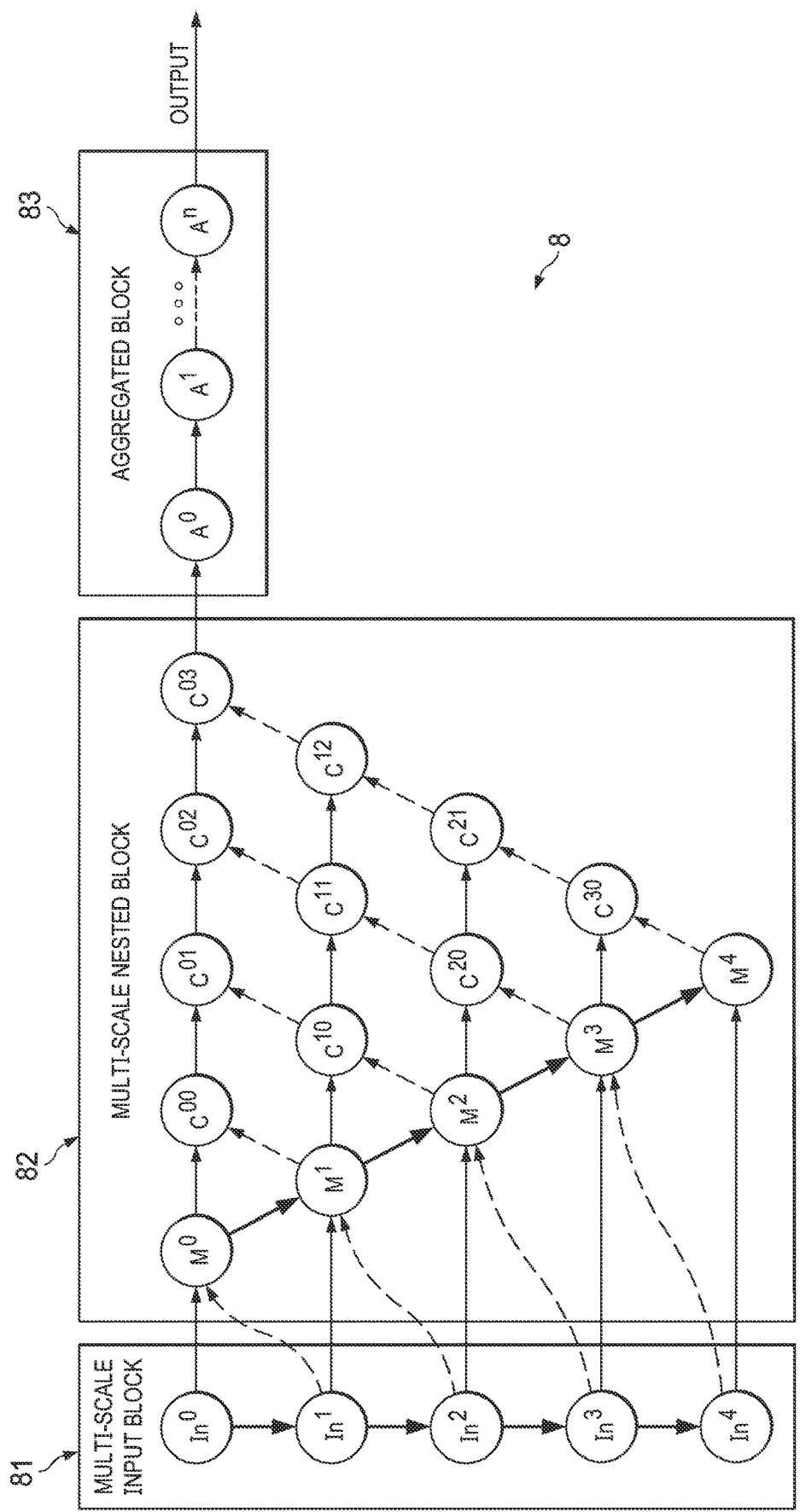
FIG. 8 illustrates an exemplary architecture of an AMS-Nest with added concatenations between the multi-scale input block and M blocks on different floors of the multi-scale nested block.

Finally, FIG. 8 illustrates an exemplary architecture 8 of an AMS-Nest with added concatenations between the multi-scale input block 81 and the M blocks on different floors of the multi-scale nested block 82. FIG. 8 also shows a corresponding aggregation block 83. The respective upsampling and concatenation processing is indicated in FIG. 8 by respective upward arrows. As illustrated in the depicted example, the input of the $(f+1)_{th}$ floor can be fed into the M block of $f_{th}$ floor.

In FIG. 8, the first encoding layer $M^0$ is configured to generate the first encoded data set by performing a convolution based on the input data $In^0$ and an upsampled first downsampled input data set, wherein the upsampled first downsampled input data set is obtained by upsampling the first downsampled input data set $In^1$. The second encoding layer $M^1$ is configured to generate the second encoded data set by performing a convolution based on the first downsampled input data set $In^1$ and an upsampled second downsampled input data set, wherein the upsampled second downsampled input data set is obtained by upsampling the second downsampled input data set $In^2$.

Aggregation Block

The aggregation blocks 13 or 83 may shrink the convolutional channel number and input dimension of the output of nested blocks 12 or 82 to match the target shape. The aggregation block may comprise one or more convolutional, pooling layers or even recurrent layers. Convolutional layers (which may be trainable, too) may aim to reduce the channel number gradually, the pooling layers may aim to reduce the dimension, and recurrent layers may help to sequence the outputs. The number of convolutions depends on the channel difference between input and the output of aggregation block 13 or 83. Suppose the channel of the input of the aggregated block is $N_i$, the channel of the output of the aggregated block is $N_o$ (for the mono signal, it should be 1, and for stereo signal, it should be 2), the least number of the convolutional layers $N_c$ can be calculated as:

$$N_c = \left\lceil \log_{step} \frac{N_i}{N_o} \right\rceil$$

Where step denotes the decrease exponent.

The number of the pooling layers depends on the difference of frame number in the input and output of the aggregation block. Suppose the frame number of the input of the aggregated block is $F_i$, the frame number of the output of the aggregated block is $F_o$, the number of the pooling layer $N_p$ can be calculated by:

$$N_p = \left\lceil \log_{step} \frac{F_i}{F_o} \right\rceil$$

Where step denotes the pooling size.

Interpretation

Unless specifically stated otherwise, as apparent from the following discussions, it is appreciated that throughout the disclosure discussions utilizing terms such as "processing," "computing," "calculating," "determining", "analyzing" or the like, refer to the action and/or processes of a computer or computing system, or similar electronic computing devices, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one example embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In alternative example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system executing instructions (computer-readable code)

stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one example embodiment", "some example embodiments" or "an example embodiment" means that a particular feature, structure or characteristic described in connection with the example embodiment is included in at least one example embodiment of the present disclosure. Thus, appearances of the phrases "in one example embodiment", "in some example embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The invention claimed is:

1. A computing system implementing a convolutional neural network (CNN) architecture, the CNN architecture comprising a multi-scale input block and a multi-scale nested block, wherein the multi-scale input block is configured to:
   receive input data based on an audio signal; and
   generate a first downsampled input data set by downsampling the input data;
   wherein the multi-scale nested block comprises:
     a first encoding layer configured to generate a first encoded data set by performing a convolution based on the input data,
     a second encoding layer configured to generate a second encoded data set by performing a convolution based on the first downsampled input data set,
     a first convolutional layer configured to generate a first output data set by performing a convolution based on the first encoded data set and an upsampled second encoded data set, wherein the upsampled second encoded data set is obtained by upsampling the second encoded data set, and
     a second convolutional layer configured to generate a second output data set based on the first output data set;
   wherein the computing system is configured to output an output audio signal based on the second output data set.

2. The computing system according to claim 1, wherein the multi-scale nested block further comprises:
   a third convolutional layer configured to generate a third output data set by performing a convolution based on the second encoded data set; and
   wherein the second convolutional layer configured to generate the second output data set by performing a convolution based on the first output data set and an upsampled second output data set, wherein the upsampled second output data set is obtained by upsampling the third output data set.

3. The computing system according to claim 2, wherein:
   the multi-scale input block is further configured to generate a second downsampled input data set by downsampling the first downsampled input data set,
   the multi-scale nested block further comprises a third encoding layer configured to generate a third encoded data set by performing a convolution based on the second downsampled input data set, and
   the third convolutional layer is configured to generate the third output data set by performing a convolution based on the second encoded data set and an upsampled third encoded data set, wherein the upsampled third encoded data set is obtained by upsampling the third encoded data set.

4. The computing system according to claim 1, wherein: the second encoding layer is configured to generate the second encoded data set by performing a convolution based on the first downsampled input data set and a downsampled first encoded data set, wherein the downsampled first encoded data set is obtained by downsampling the first encoded data set.

5. The computing system according to claim 2, wherein: the second third convolutional layer is configured to generate the third output data set by performing a convolution based on the second encoded data set, a downsampled first output data set, and an upsampled third encoded data set, wherein the downsampled first output data set is obtained by downsampling the first output data set and the upsampled third encoded data set is obtained by upsampling the third encoded data set.

6. The computing system according to claim 2, wherein: the second convolutional layer is configured to generate the second output data set by performing a convolution based on the first output data set, an upsampled second output data set, and the first encoded data set, wherein the upsampled second output data set is obtained by upsampling the second output data set.

7. The computing system according to claim 3, wherein: the third encoding layer is configured to generate the third encoded data set by performing a convolution based on the second downsampled input data set, a downsampled first encoded data set, and a downsampled second encoded data set, wherein the downsampled first encoded data set is obtained by downsampling the first encoded data set and the downsampled second encoded data set is obtained by downsampling the second encoded data set.

8. The computing system according to claim 2, wherein the CNN architecture comprises a weighted adding block configured to:
apply a first weight to the third output data set,
apply a second weight to the second output data set, and
generate an output of the multi-scale nested block based on the weighted third output data set and the weighted second output data set.

9. The computing system according to claim 1, wherein: the first encoding layer is configured to generate the first encoded data set by performing a convolution based on the input data and an upsampled first downsampled input data set, wherein the upsampled first downsampled input data set is obtained by upsampling the first downsampled input data set, or
the second encoding layer is configured to generate the second encoded data set by performing a convolution based on the first downsampled input data set and an upsampled second downsampled input data set, wherein the upsampled second downsampled input data set is obtained by upsampling the second downsampled input data set.

10. The computing system according to claim 1, wherein the multi-scale input block comprises a convolutional layer or a dense layer configured to generate the first downsampled input data set based on the input data.

11. The computing system according to claim 1, wherein the multi-scale input block is configured to generate the first downsampled input data set using maximum pooling processing, average pooling processing, or a mixture of maximum and average pooling processing.

12. The computing system according to claim 1, wherein the first encoding layer or the second encoding layer comprises a multi-scale convolutional block configured to generate an output by concatenating or adding outputs of at least two parallel convolution paths.

13. The computing system according to claim 12, wherein the multi-scale convolutional block is configured to weight the outputs of the at least two parallel convolution paths using different weights.

14. The computing system according to claim 1, wherein the input data includes an audio signal, wherein the CNN architecture further comprises an aggregation block configured to receive an output of the multi-scale nested block, and wherein the aggregation block comprises at least one of:
a convolutional layer configured to reduce a channel number associated with the input data,
a pooling layer configured to reduce a dimension associated with the input data, and
a recurrent layer configured to sequence the output of the multi-scale nested block.

15. The computing system according to claim 3, wherein the multi-scale input block is further configured to generate a third downsampled input data set by downsampling the second downsampled input data set, and wherein the multi-scale nested block further comprises:
a fourth encoding layer configured to generate a fourth encoded data set by performing a convolution based on the third downsampled input data set,
a fourth convolutional layer configured to generate a fourth output data set by performing a convolution based on the third encoded data set and an upsampled fourth encoded data set, wherein the upsampled fourth encoded data set is obtained by upsampling the fourth encoded data set,
a fifth convolutional layer configured to generate a fifth output data set by performing a convolution based on the second output data set and an upsampled fourth output data set, wherein the upsampled fourth output data set is obtained by upsampling the fourth output data set, and
a sixth convolutional layer configured to generate a sixth output data set by performing a convolution based on the third output data set and an upsampled fifth output data set, wherein the upsampled fifth output data set is obtained by upsampling the fifth output data set.

16. An apparatus for audio processing, wherein:
the apparatus is configured to receive input of an input audio signal and output an output audio signal; and
the apparatus comprises a computing system implementing a convolutional neural network (CNN) architecture, the CNN architecture comprising a multi-scale input block and a multi-scale nested block, wherein the multi-scale input block is configured to:
receive input data, and
generate a first downsampled input data set by downsampling the input data,
wherein the multi-scale nested block comprises:
a first encoding layer configured to generate a first encoded data set by performing convolution based on the input data,
a second encoding layer configured to generate a second encoded data set by performing a convolution based on the first downsampled input data set, and
a first convolutional layer configured to generate a first output data set by performing a convolution based on the first encoded data set and an upsampled second encoded data set, wherein the upsampled second encoded data set is obtained by upsampling the second encoded data set;

wherein the input data received by the multi-scale input block is based on the input audio signal and the output audio signal is based on a second output data set generated by a second convolutional layer of the multi-scale nested block.

17. A method of audio processing using a convolutional neural network (CNN), the method comprising:

receiving input data based on an audio signal;

generating a first downsampled input data set by downsampling the input data;

generating a first encoded data set by performing a convolution based on the input data;

generating a second encoded data set by performing a convolution based on the first downsampled input data set;

generating a first output data set by performing a convolution based on the first encoded data set and an upsampled second encoded data set, wherein the upsampled second encoded data set is obtained by upsampling the second encoded data set;

generating a second output data set by performing a convolution based on the first output data set; and outputting an audio signal based on the second output data set.

18. The method of claim 17, further comprising:

generating a third output data set by performing a convolution based on the second encoded data set; and generating the second output data set by performing a convolution based on the first output data set and an upsampled second output data set, wherein the upsampled second output data set is obtained by upsampling the third output data set.

19. A non-transitory computer-readable storage medium comprising executable instructions that, when executed by an electronic processor, cause the electronic processor to perform the method according to claim 17.

* * * * *